United States Patent
Barton et al.

(10) Patent No.: US 6,307,926 B1
(45) Date of Patent: Oct. 23, 2001

(54) SYSTEM FOR DETECTION AND PREVENTION OF TELECOMMUNICATIONS FRAUD PRIOR TO CALL CONNECTION

(75) Inventors: Richard Hillix Barton, Foster City, CA (US); Zahid Ali Abbasi, Overland Park, KS (US); Isaac Shane Allen, Lee's Summit, MO (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

(21) Appl. No.: 09/082,233

(22) Filed: May 20, 1998

(51) Int. Cl.[7] ....................................................... H04M 3/00
(52) U.S. Cl. ............... 379/189; 379/114.14; 379/114.15; 379/114.03; 379/145; 379/188; 379/196
(58) Field of Search ..................................... 379/34, 91.01, 379/93.02, 114.14, 188, 189, 190, 191, 192, 194, 196, 114.15, 114.03, 145

(56) References Cited

U.S. PATENT DOCUMENTS

| | | | |
|---|---|---|---|
| 5,768,354 | * | 6/1998 | Lange et al. .......................... 379/189 |
| 5,802,156 | * | 9/1998 | Felger ............................... 379/112.01 |
| 6,163,604 | * | 12/2000 | Baulier et al. ........................ 379/189 |
| 6,188,753 | * | 2/2001 | Afsar et al. ...................... 379/114.14 |
| 6,212,266 | * | 4/2001 | Busuioc ................................ 379/189 |

\* cited by examiner

Primary Examiner—Ahmad Matar
Assistant Examiner—Bing Bui
(74) Attorney, Agent, or Firm—Richard H. Barton; Zahid A. Abbasi; Isaac S. Allen

(57) ABSTRACT

An improved system for detecting and preventing telecommunications fraud prior to call connection, in which attempted calls are screened for fraud at the point of calling card validation in the SCP. The SCP accesses a database holding a variety of fraud decision nodes that may be interrelated and grouped together to cooperatively define fraud screening trees against which attempted calls may be tested. A fraud screening tree ultimately produces a fraud prediction based on a variety of information concerning the attempted call. The present invention therefore facilitates fraud screening with greater granularity and customization.

81 Claims, 3 Drawing Sheets

SYSTEM FOR DETECTION AND PREVENTION OF TELECOMMUNICATIONS FRAUD PRIOR TO CALL CONNECTION

RELATED APPLICATIONS

Not applicable

FEDERALLY SPONORED RESEARCH OR DEVELOPMENT

Not applicable

MICROFICHE APPENDIX

Not applicable

BACKGROUND OF THE INVENTION

1. Field of the Invention

The present invention relates generally to telecommunications systems and more particularly to an improved method and system for preventing fraudulent calls prior to call connection.

2. Description of the Related Art

Telephone fraud is a major area of abuse in the United States and throughout the world. Such fraud frequently involves the unauthorized or bogus use of telephone billing numbers, which have been assigned to customers and are associated with customer billing accounts. These numbers are typically imprinted or encoded on wallet sized cards, which are provided to customers to enable the customers to easily charge calls to their respective billing accounts. Consequently, these numbers are commonly referred to as telephone calling card numbers. As those of ordinary skill in the art will appreciate, however, the terms "calling card number," "billing number" and "bill number" are not restricted to card-based numbers but may refer more generally to any number used to bill or track telecommunications services. Network Configuration and Signaling A typical telecommunications network is depicted and described in U.S. Pat. No. 5,602,906, which issued on Feb. 11, 1997 in the name of Phelps, for a toll fraud detection system ("the Phelps patent.") The Phelps patent, which is assigned to the assignee of the present invention, is expressly incorporated herein by reference.

Generally, a telecommunications network includes telephone units interconnected to each other via central offices owned by local exchange carriers (LECs). These central offices are in turn interconnected to each other via network equipment owned by long distance service providers, or interexchange carriers (IXCs). The LEC provides local switches for receiving and forwarding calls placed to and from the interconnected telephone units as well as a tandem switch for passing calls between the local switches and the IXC. The IXC in turn includes switches designed to receive and forward calls to and from the LECs and from point to point throughout the IXC's long distance network.

In order to establish a communication path for connecting a given call, an IXC network typically provides a signaling system. The signaling system allows network elements such as switches to exchange information regarding the routing of telecommunications traffic over network connections. For example, the signaling system might transfer a dialed number from switch to switch so that each switch along the call path can process the dialed number and select connections for the call. A well known example of a signaling system is Signaling System #7 (SS7).

In most cases, the IXC network includes a service control point (SCP), which serves to process signaling messages transmitted throughout the network. The SCP is typically coupled to the IXC switches over signaling links and through signaling transfer points (STPs), which allow the SCP to exchange signaling messages with the switches.

When a switch or other network system (such as an operator assistance center, for instance) requires routing additional information to facilitate completion of a particular call, it will usually transmit a signaling message to an SCP, requesting the additional information. This message is commonly known as a transaction capabilities application part (TCAP) message and identifies information specific to the call, such as caller number (known as ANI), dialed number and calling card number.

The SCP serves primarily to validate customer information and to provide routing information to the querying system, based on information contained in the TCAP message. An example of this mechanism is disclosed, for instance, in U.S. Pat. No. 5,694,463, entitled "System for Service Control Point Routing" (the '463 patent), which issued on Dec. 2, 1997. The '463 patent is assigned to the owner of the present invention and is expressly incorporated herein by reference.

As described in the '463 patent, when the SCP receives a TCAP, it checks the format of the message and then performs customer validation. To validate customer information, the SCP refers to one or more validation databases that contain a list of customer information. As known by those skilled in the art, this information may provide a negative list of calling card numbers blocked or "stunned" from use. Alternatively, other configurations are also possible. Based on this validation process, the SCP returns a response TCAP message to the querying system, indicating either that the call may proceed or that the call should be treated as blocked.

If the SCP validates the customer information associated with the proposed call, the SCP then retrieves a corresponding customer record from the database. The customer record is typically identified by information in the TCAP message and includes a routing tree identification (ID). The SCP uses this routing tree ID to access a customer's particular routing plan and particularly to identify a connection to which the switch should route the call for the particular customer.

More specifically, as further described by the '463 patent, the SCP may include a routing tree structure that defines routing information for a given call. The routing tree consists of a series of "decision nodes," each of which is defined by a database table that contains particular criteria and yields a predetermined result. The routing tree produces a determination of where to route the call, in the form of a trunk and switch combination. The SCP in turn places these connection identifiers in a response TCAP message for return transmission to the querying system. Finally, upon receipt of this response TCAP message, the switch or other requesting element routes the call as instructed.

The Need for Fraud Prevention

Fraudulent use of calling card numbers has evolved over the years and has unfortunately responded to telephone company detection efforts. As interexchange carriers have developed new systems to detect and prevent fraud, criminals have developed new tactics for defeating those very detection schemes.

In an early form, for instance, calling card fraud was detected by customers or long distance service providers who recognized the existence of unauthorized charges on customer billing statements. In response, interexchange carriers developed systems for monitoring records of completed calls, in search of aberrations or telltale signs of fraud. In turn, however, criminals developed methods of maximizing their fraudulent use of card numbers before the calls are completed. For example, organized groups of criminals have arranged to simultaneously or serially make multiple calls from phones across the country using a single stolen calling card number. As another example, criminals have used stolen card numbers to make expensive overseas calls that last many hours at a time and that evade detection until completed.

The process of preventing calling card fraud has typically involved analyzing a history of abuse in order to identify trends, and thereby formulating rules for responding to similar events in the future. Frequently, such systems detect fraud primarily based on generic calling patterns for a given calling card. For instance, the IXC may employ a fraud management system that regularly receives call records from the SCP and automatically applies thresholds developed from historical fraud patterns associated with previously abused cards and account history. If the call satisfies a sufficient threshold, the fraud management system may instruct the SCP to block subsequent calls that use the card number. Typically, the SCP would then include the blocked calling card number in a database for reference in the validation process described above.

In other instances, history may reveal a need to prevent the connection of calls from certain areas to certain destinations. For example, reports may identify that certain payphones in New York have repeatedly been the source of fraudulent calling card calls to Guadalajara, Mexico. Existing systems have responded to this situation by configuring the associated IXC switches to prevent such calls from being connected. For example, those skilled in the art are aware that Northern Telecom manufactures a DMS-250 switch, that may include a table of international restrictions to be tested for each attempted call. One such restriction, for instance, may preclude any calls destined for Guadalajara, Mexico.

Unfortunately, however, adding such call processing logic to the switch can be inefficient and expensive, for several reasons. First, the IXC may not directly administer its switches and may require the assistance of others (such as the switch vendor, for instance) to implement new preconnect fraud rules in the switches. Second, a typical IXC network includes numerous switches (on the order of 30–40 in an illustrative network). Consequently, the IXC may need to reconfigure hardware or software in all of its switches in order to implement the desired change. For instance, if the IXC determines that calls to Guadalajara, Mexico are typically fraudulent, the IXC would need to include an appropriate indication in every switch in its network. Absent such measures, criminals would undoubtedly find the "unprotected" switch and continue their crimes. At the same time, of course, this protection scheme will unfortunately prevent some legitimate billing number calls from connecting to blocked countries.

Telecommunications fraud has subjected interexchange carriers to financial loss, in part because the charges for such calls are frequently uncollectible. This is especially the case with international calls, because the interexchange carrier handling the call may have to transfer payments to the destination telephone company, even if the toll charge is uncollectible.

Further, the effects of telecommunications fraud have extended to others as well. For instance, interexchange carriers may sell long distance service to local exchange carriers or other companies that act as apparent "long distance service providers" to callers. An LEC, for instance, may establish its "own" long distance service for its customers by arranging for an interexchange carrier to supply the service and providing its customers with calling cards. By arrangement with the IXC, these calling cards may be associated with specific platforms in the IXC's switches to define custom logic for processing calls made with the cards.

Fraudulent use of such LEC calling card numbers may not only affect the interexchange carrier that actually provides the service, but may also affect customer perception of the local company that issues the cards. In some circumstances, these companies as well as the associated IXC may in turn suffer financial loss as a result of such calling card fraud.

In view of these deficiencies in the art, a need exists for a more efficient and intelligent system of preventing telecommunications fraud.

SUMMARY OF THE INVENTION

The present invention comprises an improved system for preventing fraud in a telecommunications network prior to call-connection. According to the invention, pre-connect fraud screening is conducted at the point of card validation in the SCP, rather than in the switch. The SCP is provided with logic to screen attempted calls for predefined indicia of fraud and to instruct a switch or other network element to block or otherwise handle the call. This pre-call fraud prevention logic may take the form of a fraud screening tree stored as database tables in the SCP or otherwise accessible by the SCP. The fraud screening tree may include one or more decision nodes that ultimately culminate in a intelligent prediction of whether or not the attempted call is likely to be fraudulent and should therefore not be connected. Based on this prediction, the SCP then inserts a success or failure message into a response TCAP message and passes the response TCAP back to the querying system.

Advantageously, the present invention allows an IXC to intelligently screen for fraud at the point of calling card validation and to thereby prevent fraudulent calling card calls before the calls are connected. For example, if a certain phone is known to originate or receive a large number of fraudulent calls, the present invention will enable an IXC to block that phone from originating or receiving calls. By stopping fraudulent calls from being completed, the invention can better satisfy customers and increase revenue.

Further, the invention improves over the existing art by allowing an IXC to define suspected fraud calling routes at much finer granularity than previously available, thereby giving fraud analysts a greater opportunity to differentiate between good and bad calling patterns. With the present invention, for example, SCP fraud screening is not limited to validating card numbers that have been previously found to be at high risk for fraud, as has traditionally been done with a "stun" list as described above. Rather, by providing appropriate configurations of fraud screening trees, the present invention enables an SCP to screen call attempts based on a variety of criteria, such as originating and terminating number, phone type (residential, payphone, hotel, etc.), date and time, and originating switch, and to intelligently predict whether the call is likely to be fraudulent.

Still further, the present invention improves over existing pre-connect fraud prevention systems in which fraud processing has been provided in IXC switches. By moving fraud screening rules to the SCP, the IXC gains better control over the screening process. A typical IXC network includes numerous switches but only one or a small number of SCPs. Therefore, to update or modify fraud screening rules according to the present invention, the IXC need only modify tables or programs stored in the SCP rather than reconfiguring hardware or software in all of the network switches. Additionally, while an IXC might not directly administer the switches, the IXC might have direct control over its SCPs. Therefore, the IXC may more readily provide fraud control processing in the SCP.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF THE PREFERRED EMBODIMENTS

Figure 1:
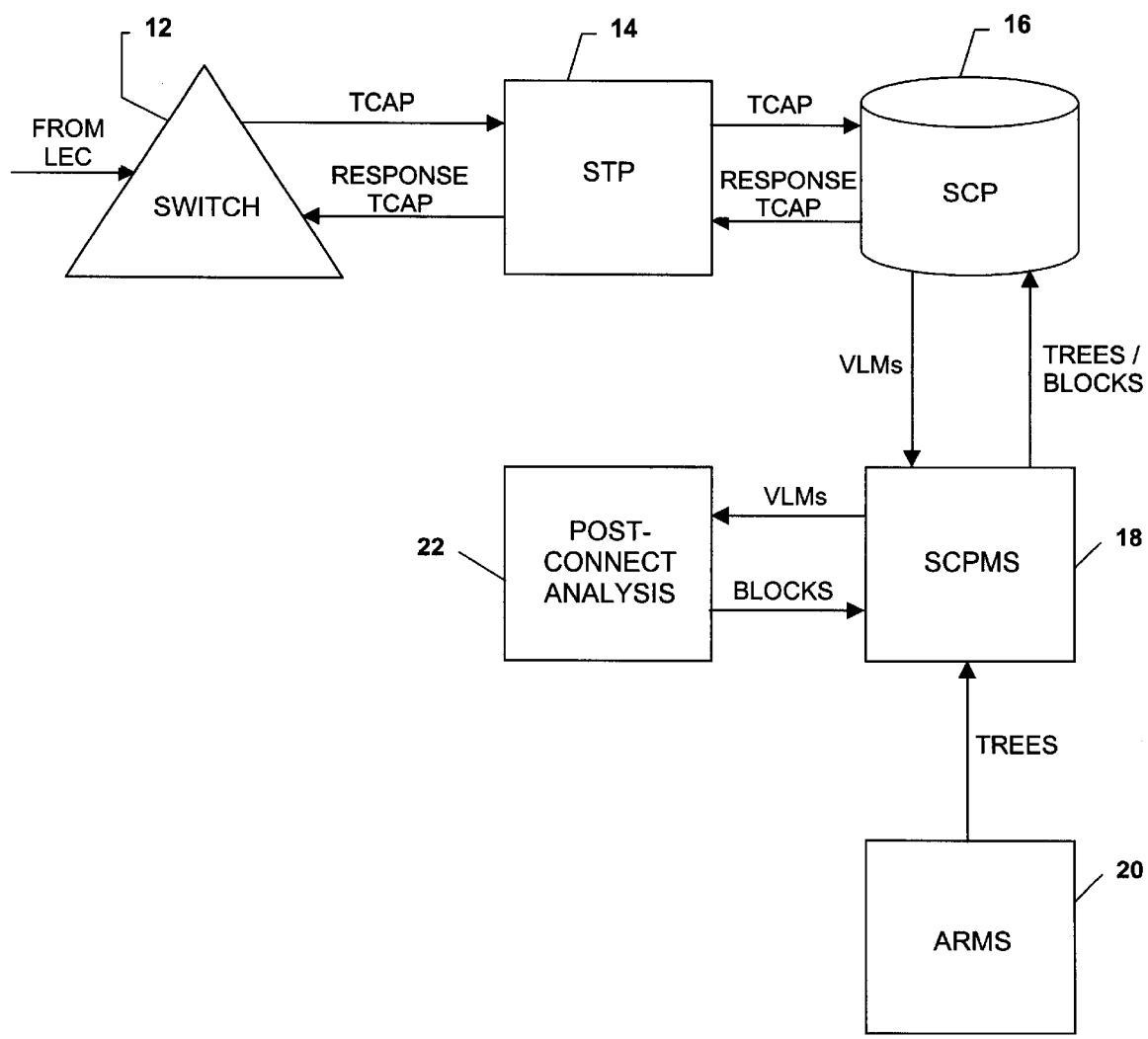
FIG. 1 is a block diagram providing a structural overview of a preferred embodiment of the present invention.

Referring to the drawings, FIG. 1 provides a structural overview of a network in which a preferred embodiment of the present invention may be implemented. As shown in FIG. 1, a switch 12 is interconnected to an STP 14, which is in turn interconnected to an SCP 16. By convention, SCP 16 is interconnected to a service control point management system (SCPMS) 18, which serves as an external data interface to the SCP. SCPMS 18 is in turn interconnected to an advanced risk management system 20 and a post-connect analysis system 22. These components may be linked together by wired or wireless links of a form well known in the art. In the preferred embodiment, the present invention operates using SS7 messages and processing. However, other systems, such as C7, TCP/IP, and X.25, are equally applicable.

In addition, it will be appreciated that the present invention is not limited to use in connection with the specific network configuration illustrated in FIG. 1. Other networks are possible. As one alternative, for example, switch 12 may be connected directly to SCP 16 or may pass signaling messages directly to SCP 16, rather than through STP 14.

Switches, STPs and SCPs are well known in the art. A switch is any device that interconnects incoming network connections. An STP serves to route signaling messages within the signaling system of the network. An SCP in turn typically includes a system that receives signaling messages from a network element (such as a switch or STP, for instance) and uses a database to provide information to that element in the form of a reply signaling message. For purposes of illustration in this description, switch 12 may be a Northern Telecom DMS-250, and STP 14 may be a DSC Megahub.

As described in the above background section, switch 12 will typically receive an incoming call from a LEC. Before connecting the call to another switch in the network, switch 12 will collect information about the call (such as the caller's billing number) and pass a TCAP message through STP 14 to SCP 16 to seek customer validation. SCP 16 will receive the TCAP and reply with a response TCAP to the switch indicating whether the customer's bill number is valid Because switch 12 is the network element that queries SCP 16 for information, switch 12 may be referred to as the querying system. Those skilled in the art will appreciate, however, that other querying systems are equally possible. For instance, rather than a switch, the querying system may be an operator center, which may receive a calling card call and may pass a TCAP to SCP 16 in order to validate the caller's bill number before allowing the call to be connected.

As is known in the art, SCP 16 typically generates a database record in response to its customer validation effort. This database record may be referred to as a "validation log message" or "VLM." The VLM conventionally identifies information similar to that contained in the TCAP message and additionally identifies whether or not the validation was successful. The IXC may then use these VLMs to conduct post-connect fraud analysis in order to identify calling card numbers that should be blocked from subsequent use. In particular, SCP 16 may pass each VLM through SCPMS 18 to post-connect fraud analysis system 22. There, an automated system as well as human fraud analysts may study case records and issue instructions to block specified calling card numbers, in an effort to prevent further fraud. Post-connect fraud analysis system 22 may then transmit these instructions or "blocks" to SCP, where the blocked numbers may be stored in validation table for subsequent reference.

Pre-Connect Fraud Screening In The SCP

Figure 2:
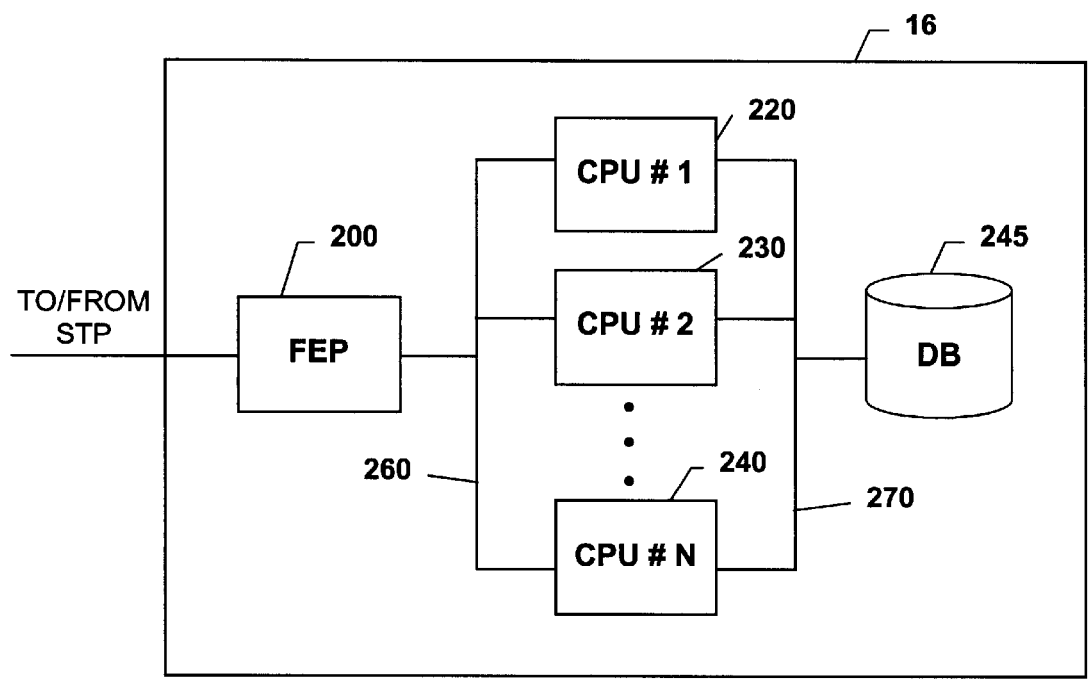
FIG. 2 is block diagram illustrating an illustrative embodiment of an SCP in accordance with a preferred embodiment of the present invention.
Figure 3:
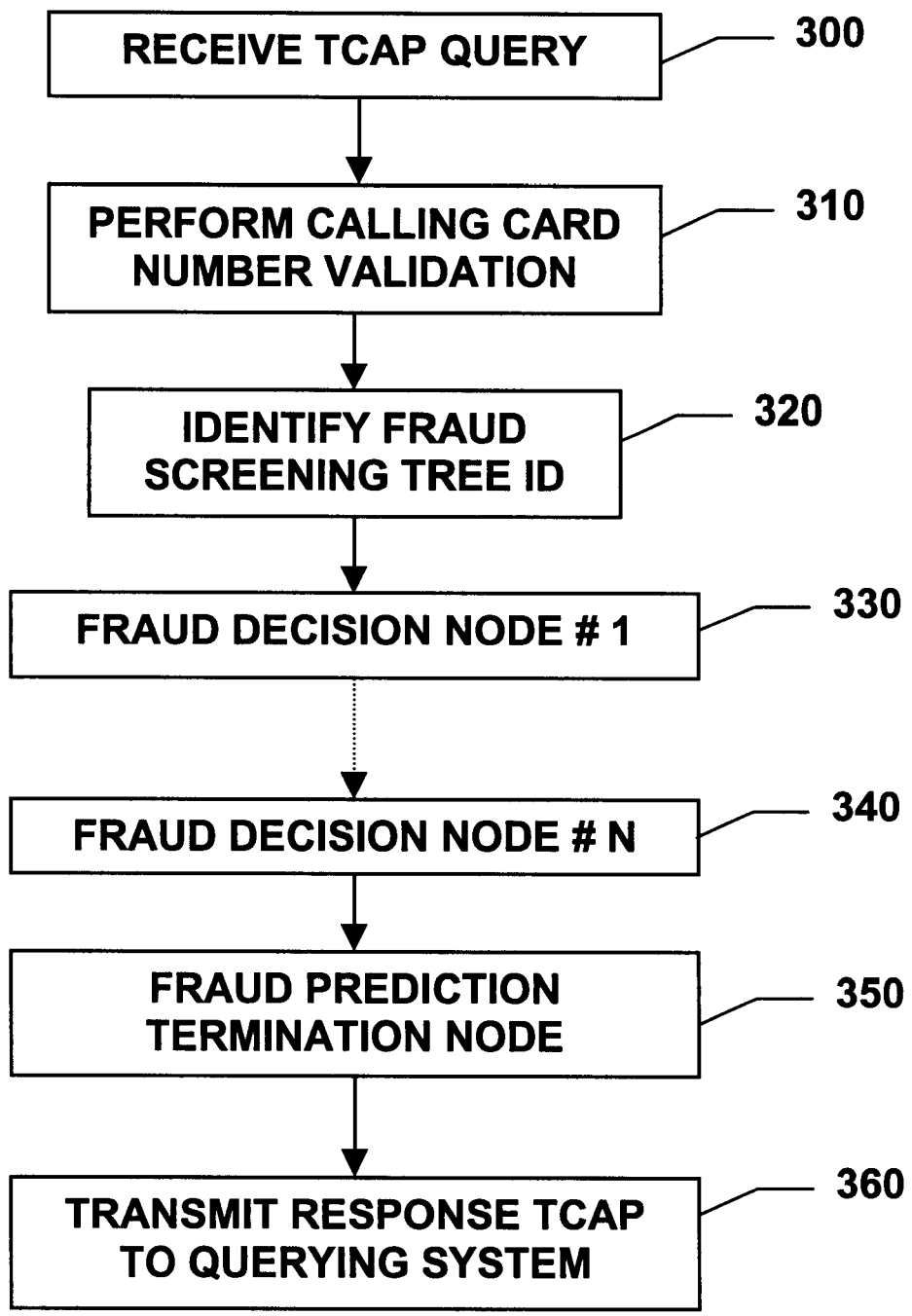
FIG. 3 is a flow chart illustrating a pre-connect fraud screening process performed in accordance with a preferred embodiment of the present invention.

FIGS. 2–3 illustrate a configuration and operation of SCP 16 according to a preferred embodiment of the present invention. Referring first to FIG. 2, an illustrative embodiment of SCP 16 is shown. In this embodiment, SCP 16 is comprised of a front end processor (FEP) 200, multiple central processing units (CPUs) 220–240, and a database (DB) 245. FEP 200 may be a Tandem ST-2000. FEP 200 is linked to multiple CPUs over link 260. Such links are well known in the art. The CPUs include CPU 220, CPU 230, and CPU 240, but, as indicated, the number of CPUs may vary. The CPUs are linked to DB 245 by link 270. CPU 220, CPU 230, CPU 240, link 270, DB 245, and a portion of link 260 might be housed in a Tandem Cyclone computer. Those skilled in the art are aware of other hardware and architectures which can support the functional requirements of the present invention as well.

FEP 200 transmits and receives signaling messages for the CPUs and provides an interface for SCP 16 with the SS7 network. In particular, it can apply SS7 message transfer part (MTP) and signaling connection control part (SCCP) functions to the signaling messages being exchanged with the network. Those skilled in the art are familiar with these functions.

The CPUs receive signaling messages from FEP 200 and process the information to obtain the information sought by the switch. The processing entails the use of various software including an operating system, a database management system, various utilities, and applications. The operating system could be Tandem Guardian. Those skilled in the art are aware of other operating systems and software which can support the processing called for by the present invention. Typically, the utilities will comprise communications software, processor control software, and SS7 interface software, but other utilities are possible.

FIG. 3 is a flow chart depicting the processing performed by SCP 16 according to a preferred embodiment of the present invention. Referring to FIG. 3, at step 300, SCP 16 interfaces with the SS7 network, for instance, by receiving a TCAP message as described above. The configuration and information that may be provided by TCAP messages are known in the art and may include, for instance, the originating or calling phone number, the dialed or called number, and the type of phone (e.g., prison phone, hotel phone, residential phone, pay phone) from which the call was placed.

At step 310, SCP 16 analyzes the TCAP message and performs calling card number validation. First, SCP 16 checks the format of the message, to verify that the data fields contain values. The SCP then extracts the calling card number from the TCAP and compares the number to numbers stored in a validation database. This process may entail searching for a matching number in a list of IXC card numbers. Alternatively or additionally, in the case of LEC calling cards, this process may entail querying an LEC database for validation information. Still alternatively or additionally, this process may entail checking the list of blocked card numbers to determine whether the card number has been blocked based on previous fraud analysis or for other reasons.

If the calling card number is invalid or blocked, the SCP inserts a call failure message in a response TCAP and passes the response TCAP to the querying system to instruct the system to not connect the call. If the calling card number is valid and not blocked, however, then, at step 320, the SCP proceeds to identify an appropriate fraud screening tree to apply to the call attempt.

According to the preferred embodiment, each calling card number or group of calling card numbers (such as those issued by a given LEC, for instance) may be associated with a specified fraud screening tree, which includes a predetermined set of decision nodes. In this way, an IXC may advantageously provide specialized levels of intelligent fraud screening for different groups of customers. For instance, by agreement with one LEC, the IXC may provide the LEC with pre-connect fraud screening that precludes all calls made from a designated bank of payphones to a designated country. At the same time, by agreement with another LEC, the IXC may provide the other LEC with pre-connect fraud screening that precludes calls from that same bank of payphones to the designated country only during certain hours of the day.

To achieve this customer-specific fraud screening, the invention may employ a tree mapping database table. The tree mapping table may be stored in DB 245 at the SCP or in another storage medium accessible by the SCP. The tree mapping table is preferably keyed to a service code designation associated with the billing number. This service code designation may be provided by a customer database keyed to the billing number or, alternatively, may be provided to the SCP by an LEC database or some other source.

The service code designation is preferably derived from information that serves to distinguish the level of fraud screening to be provided for the billing number. For instance, in order to provide distinct levels of fraud screening to different market groups, the service code designation for a billing number may be derived from an indication of the market group or market class to which a billing number belongs. As examples, the market group may be the LEC that issued the calling card or may be a broader category such as "business customer" or "residential customer." Additionally, the service code designation may be derived from a subjective rating of fraud potential for the billing number, which may be established from prior revenue analysis or prior fraud analysis.

It will be appreciated that the service code designation is not restricted to being based on indicia of market group and fraud potential. The service code designation may be based on other information as well, where the information serves to distinguish the level of pre-connect fraud screening that is to be provided to various billing numbers in accordance with the present invention.

In the preferred embodiment, by reference to the service code designation, the tree mapping table provides a fraud screening tree ID, which identifies a starting point or initial decision node at which the SCP will begin fraud screening for the customer. Conveniently, by reference to this tree mapping table, multiple billing numbers may point to the same screening tree or to different screening trees, made up of the same or different combinations of fraud decision nodes.

After identifying the fraud screening tree ID, the SCP begins its fraud analysis with respect to the attempted call. According to the preferred embodiment, the SCP predicts whether or not the call is likely to be fraudulent by applying one or more fraud decision nodes, as shown illustratively at steps 330–340 in FIG. 3. A fraud decision node serves to affect the outcome of fraud screening based on a combination of various data elements or criteria. These data elements may be information carried by the TCAP message (such as calling number, called number or phone type, for instance) or the SCCP header (such as an indication of the type of querying system requesting validation) or information generated during the fraud screening process (such as information yielded by the decision nodes themselves).

Each decision node in a preferred fraud screening tree takes the form of a database table, in which rows represent various criteria and respective decisions based on that criteria. The criteria in the rows of each decision node may be customized to suit various fraud screening needs and is preferably provided by specifications transmitted from Advanced Risk Monitoring System 20. Depending on which of the criteria is satisfied, each decision node leads to another decision node, as shown at step 340, and ultimately to a final decision node or "fraud prediction termination node," as shown at step 350. Further, each decision node will preferably default to another node such as a fraud prediction termination node in the event none of its criteria is satisfied. A fraud prediction termination node will serve to provide an ultimate prediction or determination of whether or not the attempted call is likely to be fraudulent and should therefore be blocked.

It will be appreciated that the tree mapping table described above may itself be viewed as one of the decision nodes in the fraud screening tree, since, similar to other decision nodes, the mapping table points to another ("first") decision node in the screening tree. In the preferred embodiment, however, no other decision node should point to the tree mapping table as a "next" node.

Preferred fraud screening trees according to the present invention may employ any of a variety of different decision nodes, which may be designed and interrelated to one another in order to suit the fraud screening needs of particular customers or classes of customers. Further, according to the preferred embodiment, any given decision node available to SCP 16 for fraud screening may be employed by SCP 16 in the context of more than one fraud screening tree structure.

As presently contemplated, for instance, a fraud screening tree may include the following types of decision nodes, each of which will be described in turn:

Date/Time Node (DTN)
Call Origination Node (CON)
Information Digits Node (IDN)
Originating Point Code Node (OPCN)
Dialed Number Node (DNN)

By specifying criteria for the rows in these various nodes and having the nodes point to other nodes in response to satisfaction of the criteria, an IXC can advantageously use the fraud screening tree structure to predict fraud with much finer granularity than previously available. As a result, the IXC can better serve a diverse customer base.

A date/time node may alter fraud screening based on the time of day, the day of week, or the date. Depending on one of more of these factors, the date/time node may lead the SCP to another decision node in the fraud screening tree. Alternatively, it may lead the SCP to a fraud prediction termination node in order to establish in a response TCAP that the call should be allowed or blocked due to a likelihood of fraud. The following is an example of a date/time node as presently contemplated:

| Day of Year | Day of Week | Time of Day | Next Node |
|---|---|---|---|
| | MON–FRI | 0800–1659 | CON1 |
| | | 1700–0759 | CON2 |
| | SAT–SUN | 0800–1659 | CON3 |
| | SAT–SUN | 1700–0759 | FPTN1 |
| DEFAULT | | | FPTN2 |

In this example, if this date/time node is applied to a call that is placed at 8:30 a.m. on a weekday, the node would indicate that the next node in the fraud screening tree is call origination node number 1. On the other hand, if the node is applied to a call that is placed at 10:00 a.m. on a weekend, the node would indicate that the next node for the SCP to apply is call origination node number 3. Still alternatively, if the node is applied to a call that is placed at 11:30 p.m. on a Saturday night, then the node would direct the SCP to fraud prediction termination node (FPTN) number 1.

A call origination node may alter fraud screening based on the calling number. A call origination node may be entered with an NPA, NPA-NXX, ANI, country code or some other indication of the caller's origin. Depending on one of more of these factors, the call origination node may direct the SCP to another node in the fraud screening tree. If the SCP does not find call origination information in the TCAP but is faced with a call origination node in a fraud screening tree, the SCP will turn to the next node identified by the default record in the call origination node. The following is an example of a call origination node as presently contemplated:

| Origination Type | ANI | Next Node |
|---|---|---|
| International | 331 | DTN1 |
| International | 39 | FPTN1 |
| Domestic | 8165551212 | DTN2 |
| DEFAULT | | FPTN2 |

In this example, if a call originates from International country code 331, then the call origination node will direct the SCP to apply date/time node number 1 next. Alternatively, if a call originates from domestic phone number digits 816-555-1212, then the call origination node will lead the SCP to apply date/time node number 2.

An information digits node may alter fraud screening based on the type of phone originating the call. Digits defining the type of originating phone (such as a hotel/motel phone, a prison phone, a pay phone, a busness phone, or a residential phone) are typically carried in the TCAP message. By comparison of these digits with specified criteria, an information digits node may direct the SCP to another node in the fraud screening tree. In the preferred embodiment, an information digits node should be in place early in a fraud screening tree.

An originating point code node may alter fraud screening based on the particular system querying the SCP for a fraud prediction, as defined by an originating point code carried by the SCCP. Examples of querying systems include an IXC switch and an operator center, as well as an indication of a LEC associated with the calling card. By comparing the originating point code of the attempted call with criteria specified in the originating point code decision node, the node may direct the SCP to another node in the fraud screening tree. As with the other nodes, if the SCP cannot match the attempted call with any of the criteria set forth in the node, the SCP will apply node identified by the default record in the node.

A dialed number node may alter fraud screening based on the number dialed or attempted to be dialed, as indicated in the TCAP message. Depending on the number dialed, the dialed number node will preferably lead the SCP to a fraud prediction termination node, to indicate whether the call should be allowed or blocked. Each record of a dialed number node may specify ranges of dialed numbers, against which the SCP may compare the dialed number specified in the TCAP message. The following is an example of a dialed number node as presently contemplated. This example also illustrates an alternative mechanism for identifying default processing, through the use of a default field rather than a default record.

| Terminating Type | Range Start | Range End | Default | Next Node |
|---|---|---|---|---|
| Domestic | 9139675000 | 9139675000 | N | FPTN1 |
| Domestic | 5152221211 | 5152221212 | N | FPTN1 |
| Domestic | | | Y | FPTN2 |
| International | | | Y | FPTN2 |

In this example, if the dialed number is 913-675-5000 or 515-222-1211, then the dialed number node will direct the SCP to apply fraud prediction termination node number 1. Alternatively, if the dialed number is some other domestic or international number, the dialed number node will direct the SCP to apply fraud prediction termination node number 2 as a default.

Referring again to FIG. 3, at step 350, the SCP applies a fraud prediction termination node in order to provide a response TCAP message to the querying system. The fraud prediction termination node preferably operates by updating or providing data to fields in a response TCAP message, in order to identify to the querying system whether to allow or bock the attempted call.

In the preferred embodiment, the fraud prediction termination node inserts a return class of service (RCOS) value in the response TCAP message, which indicates to the querying system either that the querying system should connect the call or that the querying system should not connect the call due to a likelihood that the call is fraudulent. In the event the RCOS instructs the querying system to block the call, the querying system may then issue an announcement to the caller that the call cannot be placed.

Pre-call fraud screening within the present invention thus enables an IXC to predict whether a call is fraudulent based on a variety of specified criteria, before the call is connected. Consequently, the invention may be advantageously designed to suit the diverse needs of a variety of customers or classes of callers.

EXAMPLE

To illustrate the operation of a pre-connect fraud screening according to a preferred embodiment of the present invention, assume that the IXC provides long distance calling card service for LEC A and that historical data has established that calling card fraud is prevalent for calls made from payphones in Los Angeles to Guadalajara, Mexico during the hours of 11:00 p.m. to 7:00 a.m. Assume further that, by agreement with LEC A, the IXC employs the pre-connect fraud screening functionality of the present invention to block such calls.

Assume next that a person places a call on November 22 at 4:00 a.m. from a payphone "P" in Los Angeles to Guadalajara, Mexico, using an IXC calling card issued by LEC A. In response, switch 12 will pass a TCAP message through STP 14 to SCP 16. The TCAP message will define information about the attempted call, including the calling card number, the date/time of call, the originating point code, information digits and dialed number. Assume that the SCP first performs traditional calling card validation and determines that the card number is valid and is not set to be automatically blocked.

By reference to a customer database, the SCP might determine that the calling card is an LEC card, and the IXC may therefore query an LEC database for the service code designation associated with card numbers issued by LEC A. In turn, by reference to the tree mapping table, the SCP may determine that the initial fraud screening node for the service code designation is information digits node number 1 (IDN1). The SCP would then refer to IDN1 and determine that attempted calls from payphones should continue with fraud screening at date/time node number 1 (DTN1). DTN1 might indicate that, for calls placed on November 22, the SCP should continue processing with date/time node number 2 (DTN2). DTN2 might indicate, in turn, that calls made between midnight and 5:00 a.m. should continue with fraud screening at originating point code node number 1 (OPCN1). OPCN1 might then indicate that calling card calls originating from switch 12 should continue fraud screening at dialed number node 1 (DNN1). DNN1 might then indicate that, for calls made from payphone P in Los Angeles, the SCP should continue processing at a fraud prediction termination node number 1 (FPTN1). Finally, FPTN1 may insert into a response TCAP message an RCOS that instructs the querying system to block the attempted call due to a likelihood of fraud.

Upon receipt of the response TCAP, switch 12 may, for instance, provide a message to the caller indicating that the call cannot be completed. Alternatively or additionally, the switch may connect the call to an operator center or dedicated fraud management center for further handling.

Fraud Screen Development

As indicated above, Advanced Risk Monitoring System (ARMS) 20 may serve to provide the content of fraud decision nodes to SCP 16 for use in pre-connect fraud screening. ARMS 20 preferably establishes this content based on information that an analyst enters at a user interface. Through the use of ARMS 20, users can preferably implement as desired any of a variety of fraud screening conditions. As a result, an IXC can efficiently customize fraud screening services for designated customers or classes of customers.

According to the preferred embodiment, ARMS 20 preferably includes an ARMS server, client workstations and a database server. The ARMS server and database server may be a Sun Sparc Ultra 2, and the client workstations may each be a Sun SPARCstation 4. These components may communicate with each other via any known transmission protocol, such as TCP/IP or X.25. In the preferred embodiment, ARMS 20 communicates with SCPMS 18 via the TCP/IP protocol.

ARMS 20 preferably runs a user interface process at the client workstations, through which a user may enter in simple terms a set of desired criteria for use in fraud screening tree decision nodes. The user interface process preferably allows a user to build fraud screens that define subsets of calls and desired treatments of those calls. In turn, ARMS 20 converts these specifications into a data format that instructs the SCP 16 how to update existing decision nodes in database 245 or to add new decision nodes in database 245, in order to implement the desired fraud screen. ARMS 20 then transmits the fraud screens, via SCPMS 18, to SCP 16, and SCP 16 implements the specified instructions for use in subsequent pre-connect fraud screening.

In the preferred embodiment, a fraud screen is made up of a set of screen records, each of which serves to update or add a record to a decision node table such as those described above. For this purpose, each screen record may define a subset of calls as well as a next node type and a next node number. Additionally, each screen record should include a transaction type, which serves to instruct SCP 16 what to do with the screen record. For instance, the transaction type may specify whether SCP 16 should apply the screen record to update an existing decision node in database 245, or rather whether SCP 16 should create a new decision node in database 245. In the event the screen record is configured to update an existing decision node in a fraud screening tree, the screen record should also specify which decision node and which line number (or record) in the decision node is to be updated.

As an example, assume the following date/time decision node exists as DTN number 27 in database 245.

| Day of Year | Day of Week | Time of Day | Next Node |
|---|---|---|---|
|  | MON–FRI | 0800–1659 | CON1 |
|  |  | 1700–0759 | CON2 |
|  | SAT–SUN |  | CON3 |
| DEFAULT |  |  | FPTN2 |

Assume next that the IXC wishes to update fraud screening to provide the following decision node instead:

| Day of Year | Day of Week | Time of Day | Next Node |
|---|---|---|---|
|  | MON–WED |  | CON2 |
| Memorial Day |  |  | CON5 |
| DEFAULT |  |  | FPTN2 |

Assuming that SCP 16 is configured to understand transaction type "3" to require an update to an existing decision node record, a screen implementing these changes might include the following two screen records:

Record 1: Transaction Type: 3
  Decision Node Type: DTN
  Decision Node Number: 0027
  Decision Node Line Number 1
  Day of Year:
  Day of Week: MON-WED
  Default: N
  Next Node Type: CON
  Next Node Number: 002
Record 2: Transaction Type: 3
  Decision Node Type: DTN
  Decision Node Number: 0027
  Decision Node Line Number 2
  Day of Year: 000525
  Day of Week:
  Default: N
  Next Node Type: CON
  Next Node Number: 005

Upon transmission of this screen to SCP 16, the SCP may follow the instructions specified by the transaction type, and update the decision node accordingly.

According to the preferred embodiment, each ARMS client workstation provides a graphical users interface ("GUI"), through which a user may interact to provide the data needed for these screen records. The GUI may take any of a variety of forms. As one example, the GUI may provide a screen record entry form or dialog box to facilitate creation or modification of a screen. The screen record entry form may, for instance, prompt a user to enter ranges of date/time values, ANIs, OPCs and/or dialed numbers. The user interface process will then preferably insert the entered values as appropriate into screens such as those described above.

Before transmitting proposed screens to SCP 16 for implementation, ARMS 20 will preferably validate the proposed screen to ensure that the screen is itself internally consistent and/or to ensure that, when implemented, the proposed screen will be consistent with other records of decision nodes. For instance, when a screen proposes to update date/time node number 6 (DTN6) to specify that calls placed on Saturdays should continue with fraud screening at CON1, ARMS 20 will preferably verify that the DTN6 does not specify in another line that calls placed on Saturdays should continue with processing at CON2. In the event ARMS 20 detects any such inconsistency, it should preferably require the user to amend the screen. Once ARMS 20 verifies the screen, ARMS 20 transmit the screen to SCP 16 for implementation.

As another beneficial aspect, ARMS 20 preferably enables a user to analyze the probable impact of a newly created or modified screen by applying a mock fraud screening tree to historical VLM data. For this purpose, the user may specify a date or time range of VLMs to be screened. In response, ARMS 20 will responsively retrieve those VLM files from post-connect analysis system 22, and ARMS 20 will establish a mock fraud screening tree containing decision nodes as specified by the proposed screen, and apply the mock fraud screening tree to the designated VLM data. In the preferred embodiment, ARMS 20 may present the results of this analysis to the user through an Analysis Report Dialog at the client workstation.

Through use of ARMS 20, users can implement any of a variety of desired fraud screening conditions. As a result, an IXC can efficiently customize fraud screening services for designated customers or classes of customers.

Preferred embodiments of the present invention have thus been illustrated and described. It will be understood, however, that changes and modifications may be made to the invention without deviating from the spirit and scope of the invention, as defined by the following claims.

We claim:

1. In a telecommunications network, a method for determining whether to block an attempted call from being connected to a dialed number due to a likelihood that the attempted call is fraudulent, said attempted call being defined by information carried in a data message provided by a querying system, said method comprising, in combination:

receiving said data message into a computer system, said computer system including a database holding a plurality of fraud decision nodes cooperatively defining fraud screening trees each having a starting node, a first subset of said fraud decision nodes cooperatively defining a first fraud screening tree;

applying said first fraud screening tree to said attempted call based on said information carried in said data message, said first fraud screening tree producing a determination of whether or not to block said attempted call due to a likelihood that the attempted call is fraudulent; and before said attempted call is connected to said dialed number, returning to said querying system a response data message indicative of said determination, whereby, if said determination is to block said attempted call, said attempted call is not connected to said dialed number.

2. A method as claimed in claim 1, wherein said data message defines a billing number associated with said attempted call, and wherein said method further comprises selecting the starting node of said first fraud screening tree based on said billing number.

3. A method as claimed in claim 2, wherein said billing number is associated with a service code designation defining a predetermined level of fraud screening for said billing number, and wherein selecting the starting node of said first fraud screening tree comprises referring to a tree mapping table keyed to said service code designation.

4. A method as claimed in claim 3, wherein said service code designation further defines a predetermined market class of said billing number.

5. A method as claimed in claim 1, wherein said data message defines a billing number associated with said attempted call, said billing number is associated with a predetermined level of fraud screening, and said method further comprises selecting the starting node of said first fraud screening tree based on said predetermined level of fraud screening.

6. A method as claimed in claim 1, wherein said data message defines a billing number associated with said attempted call, said billing number is associated with a market class, and said method further comprises selecting the starting node of said first fraud screening tree based on said market class.

7. A method as claimed in claim 1, wherein said fraud decision nodes are selected from the group consisting of date/time nodes, call origination nodes, information digits nodes, originating point code nodes, and dialed number nodes.

8. A method as claimed in claim 1, wherein each of said fraud decision nodes comprises a database table, and wherein a row in each fraud decision node defines a next fraud decision node based on specified criteria.

9. A method as claimed in claim 1, wherein said data message defines a billing number, and said method further comprises, before applying said first fraud screening tree to said attempted call, verifying said billing number by reference to a validation database.

10. A method as claimed in claim 1, wherein said computer system comprises an SCP.

11. A method as claimed in claim 1, wherein said querying system comprises a telecommunications switch.

12. A method as claimed in claim 1, wherein said querying system comprises an operator center.

13. A method as claimed in claim 1, wherein said data message comprises a transaction capabilities application part (TCAP) message.

14. A method as claimed in claim 13, wherein said data message further comprises a signaling connection control part (SCCP).

15. In a telecommunications network, a method of determining that an attempted call is likely to be fraudulent and responsively preventing said attempted call from being connected to a dialed number, said attempted call defining a customer billing number, a call origination number and said dialed number, said telecommunications network including a querying system and a service control point (SCP), said querying system receiving an indication of said attempted call and responsively passing a data message to said SCP, said data message defining information about said attempted call, said method comprising, in combination:

storing, in a database accessible by said SCP, a plurality of fraud decision nodes, wherein each of said decision nodes defines criteria against which said attempted call may be tested and wherein, based on satisfaction of said criteria, said fraud decision node points to a next one of said fraud decision nodes, a given group of said fraud decision nodes thereby cooperatively defining a fraud screening tree through which said attempted call may be tested, said fraud screening tree including a final fraud decision node that defines a fraud prediction for said attempted call;

receiving said data message at said SCP;

verifying said customer billing number;

selecting, based on said customer billing number, a first fraud decision node of said fraud screening tree;

applying said fraud screening tree to said attempted call;

based on said fraud prediction, generating a response data message indicating whether or not to block said attempted call from being connected to said dialed number;

passing said response data message to said querying system; and if said response data message indicates to block said attempted call from being connected, preventing said attempted call from being connected to said dialed number.

16. A method as claimed in claim 15, wherein said billing number is associated with a service code designation defining a predetermined level of fraud screening for said billing number, and wherein selecting the first fraud decision node of said fraud screening tree comprises referring to a tree mapping table keyed to said service code designation.

17. A method as claimed in claim 16, wherein said service code designation further defines a predetermined market class of said billing number.

18. A method as claimed in claim 15, wherein said billing number is associated with a predetermined level of fraud screening, and said method further comprises selecting the first fraud decision node of said fraud screening tree based on said predetermined level of fraud screening.

19. A method as claimed in claim 15, wherein each of a plurality of groups of said fraud decision nodes define a unique fraud screening tree that may be selectively applied to a given attempted call.

20. A method as claimed in claim 15, wherein each of said fraud decision nodes is selected from the group consisting of date/time nodes, call origination nodes, information digits nodes, originating point code nodes and dialed number nodes.

21. A method as claimed in claim 15, wherein said querying system comprises a switch.

22. A method as claimed in claim 15, wherein said querying system comprises an operator center.

23. A method as claimed in claim 15, wherein said data message comprises a transaction capabilities application part (TCAP).

24. A method as claimed in claim 23, wherein said data message further comprises a signaling connection control part (SCCP).

25. In a telecommunications network, a method for determining whether to block an attempted call from being connected to a dialed number due to a likelihood that the attempted call is fraudulent, said attempted call being defined by information carried in a data message provided by a querying system, said information including a customer billing number, said method comprising, in combination:

receiving said data message into a computer system, said computer system including a database holding a plurality of fraud decision nodes defining criteria against which said attempted call may be tested and wherein, based on satisfaction of said criteria, said fraud decision nodes cooperatively defining fraud screening trees each having a starting node, a first subset of said fraud decision nodes cooperatively defining a first fraud screening tree;

selecting, based on said customer billing number, the starting node of said first fraud screening tree;

starting with the starting node, applying the plurality of fraud decision nodes defining the first fraud screening tree, said first fraud screening tree producing a determination of whether or not to block said attempted call due to a likelihood that the attempted call is fraudulent; and before said attempted call is connected to said dialed number, returning to said querying system a response data message indicative of said determination, whereby, if said determination is to block said attempted call, said attempted call is not connected to said dialed number.

26. A method as claimed in claim 25, wherein said billing number is associated with a service code designation defining a predetermined level of fraud screening for said billing number, and wherein selecting the starting node of said first fraud screening tree comprises referring to a tree mapping table keyed to said service code designation.

27. A method as claimed in claim 26, wherein said service code designation further defines a predetermined market class of said billing number.

28. A method as claimed in claim 25, wherein said billing number is associated with a predetermined level of fraud screening, and said method further comprises selecting the starting node of said first fraud screening tree based on said predetermined level of fraud screening.

29. A method as claimed in claim 25, wherein said billing number is associated with a market class, and said method further comprises selecting the starting node of said first fraud screening tree based on said market class.

30. A method as claimed in claim 25, wherein said fraud decision nodes are selected from the group consisting of a date/time node, a call origination node, an information digits node, an originating point code node, and a dialed number node.

31. A method as claimed in claim 25, wherein each of a plurality of said fraud decision nodes comprises a database table, and wherein a row in each fraud decision node defines a next fraud decision node based on specified criteria.

32. A method as claimed in claim 25, wherein said computer system comprises an SCP.

33. A method as claimed in claim 25, wherein said querying system comprises a telecommunications switch.

34. A method as claimed in claim 25, wherein said querying system comprises an operator center.

35. A method as claimed in claim 25, wherein said data message comprises a transaction capabilities application part (TCAP) message.

36. A method as claimed in claim 35, wherein said data message further comprises a signaling connection control part (SCCP).

37. In a telecommunications network, a method for determining whether to block an attempted call from being connected to a dialed number due to a likelihood that the attempted call is fraudulent, said attempted call being defined by information carried in a data message provided by a querying system, said method comprising, in combination:
  receiving said data message into a computer system, said computer system including a database holding a plurality of fraud decision nodes defining criteria against which said attempted call may be tested and wherein, based on satisfaction of said criteria, each of a plurality of said fraud decision nodes points to a next one of said fraud decision nodes, a first subset of said fraud decision nodes defining a fraud screening tree, said fraud screening tree including a starting node and a final fraud decision node that determines a fraud prediction for said attempted call;
  applying the starting node of said fraud screening tree to said attempted call based on said information carried in said data message, and applying the next one of said fraud decision nodes pointed to by the starting node based on satisfaction of the starting node criteria;
  based on satisfaction of the criteria in each applied fraud decision node, applying the next one of each fraud decision nodes pointed to by each applied decision node until the final fraud decision node determines the fraud prediction;
  based on said fraud prediction, generating a response message indicating whether or not to block said attempted call from being connected to said dialed number;
  passing said response message to said querying system; and
  if said response message indicates to block said attempted call from being connected, preventing said attempted call from being connected to said dialed number.

38. A method as claimed in claim 37, wherein said data message defines a billing number associated with said attempted call, and wherein said method further comprises selecting the starting node of said first fraud screening tree based on said billing number.

39. A method as claimed in claim 38, wherein said billing number is associated with a service code designation defining a predetermined level of fraud screening for said billing number, and wherein selecting the starting node of said fraud screening tree comprises referring to a tree mapping table keyed to said service code designation.

40. A method as claimed in claim 39, wherein said service code designation further defines a predetermined market class of said billing number.

41. A method as claimed in claim 37, wherein said billing number is associated with a predetermined level of fraud screening, and said method further comprises selecting the starting node of said fraud screening tree based on said predetermined level of fraud screening.

42. A method as claimed in claim 37, wherein each of a plurality of groups of said fraud decision nodes defines a unique fraud screening tree that may be selectively applied to a given attempted call.

43. A method as claimed in claim 37, wherein each of said fraud decision nodes is selected from the group consisting of a date/time node, a call origination node, an information digits node, an originated point code node and a dialed number node.

44. A method as claimed in claim 37, wherein said querying system comprises a switch.

45. A method as claimed in claim 37, wherein said querying system comprises an operator center.

46. A method as claimed in claim 37, wherein said data message comprises a transaction capabilities application part (TCAP).

47. A method as claimed in claim 46, wherein said data message further comprises a signaling connection control part (SCCP).

48. A method as claimed in claim 37, wherein said data message defines a billing number, and said method further comprises, before applying the starting node said fraud screening tree to said attempted call, verifying said billing number by a reference to a validation database.

49. In a telecommunications network, a method for determining whether to block an attempted call from being connected to a dialed number due to a likelihood that the attempted call is fraudulent, said attempted call being defined by information carried in a data message provided by a querying system, said information including a customer billing number associated with a predetermined level of fraud screening, said method comprising, in combination:
  receiving said data message into a computer system, said computer system including a database holding a plurality of fraud decision nodes defining criteria against which said attempted call may be tested and wherein, based on satisfaction of said criteria, said fraud decision nodes cooperatively defining fraud screening trees each having a starting node, a first subset of said fraud decision nodes cooperatively defining a first fraud screening tree;
  selecting, based on said predetermined level of fraud screening, the starting node of said first fraud screening tree;
  starting with the starting node, applying the plurality of fraud decision nodes defining the first fraud screening tree, said first fraud screening tree producing a determination of whether or not to block said attempted call due to a likelihood that the attempted call is fraudulent; and
  before said attempted call is connected to said dialed number, returning to said querying system a response data message indicative of said determination,
    whereby, if said determination is to block said attempted call, said attempted call is not connected to said dialed number.

50. A method as claimed in claim 49, wherein said billing number is associated with a service code designation defining a predetermined level of fraud screening for said billing number, and wherein selecting the starting node of said first fraud screening tree comprises referring to a tree mapping table keyed to said service code designation.

51. A method as claimed in claim 50, wherein said service code designation further defines a predetermined market class of said billing number.

52. A method as claimed in claim 49, wherein said billing number is associated with a market class, and said method further comprises selecting the starting node of said first fraud screening tree based on said market class.

53. A method as claimed in claim 49, wherein said fraud decision nodes are selected from the group consisting of a date/time node, a call origination node, an information digits node, an originating point code node, and a dialed number node.

54. A method as claimed in claim 49, wherein each of a plurality of said fraud decision nodes comprises a database table, and wherein a row in each fraud decision node defines a next fraud decision node based on specified criteria.

55. A method as claimed in claim 49, wherein said computer system comprises an SCP.

56. A method as claimed in claim 49, wherein said querying system comprises a telecommunications switch.

57. A method as claimed in claim 49, wherein said querying system comprises an operator center.

58. A method as claimed in claim 49, wherein said data message comprises a transaction capabilities application part (TCAP) message.

59. A method as claimed in claim 58, wherein said data message further comprises a signaling connection control part (SCCP).

60. In a telecommunications network, a method for determining whether to block an attempted call from being connected to a dialed number due to a likelihood that the attempted call is fraudulent, said attempted call being defined by information carried in a data message provided by a querying system, said information including a customer billing number said billing number associated with a market class, said method comprising, in combination:

receiving said data message into a computer system, said computer system including a database holding a plurality of fraud decision nodes defining criteria against which said attempted call may be tested and wherein, based on satisfaction of said criteria, said fraud decision nodes cooperatively defining fraud screening trees each having a starting node, a first subset of said fraud decision nodes cooperatively defining a first fraud screening tree;

selecting the starting node of said first fraud screening tree based on said market class;

starting with the starting node, applying the plurality of fraud decision nodes defining the first fraud screening tree, said first fraud screening tree producing a determination of whether or not to block said attempted call due to a likelihood that the attempted call is fraudulent; and before said attempted call is connected to said dialed number, returning to said querying system a response data message indicative of said determination, whereby, if said determination is to block said attempted call, said attempted call is not connected to said dialed number.

61. A method as claimed in claim 60, wherein said billing number is associated with a service code designation defining a predetermined level of fraud screening for said billing number, and wherein selecting the starting node of said first fraud screening tree comprises referring to a tree mapping table keyed to said service code designation.

62. A method as claimed in claim 61, wherein said service code designation further defines a predetermined market class of said billing number.

63. A method as claimed in claim 60, wherein said fraud decision nodes are selected from the group consisting of a date/time node, a call origination node, an information digits node, an originating point code node, and a dialed number node.

64. A method as claimed in claim 60, wherein each of a plurality of said fraud decision nodes comprises a database table, and wherein a row in each fraud decision node defines a next fraud decision node based on specified criteria.

65. A method as claimed in claim 60, wherein said computer system comprises an SCP.

66. A method as claimed in claim 60, wherein said querying system comprises a telecommunications switch.

67. A method as claimed in claim 60, wherein said querying system comprises an operator center.

68. A method as claimed in claim 60, wherein said data message comprises a transaction capabilities application part (TCAP) message.

69. A method as claimed in claim 68, wherein said data message further comprises a signaling connection control part (SCCP).

70. In a telecommunications network, a method for determining whether to block an attempted call from being connected to a dialed number due to a likelihood that the attempted call is fraudulent, said attempted call being defined by information carried in a data message provided by a querying system, said information including a customer billing number, said method comprising, in combination:

receiving said data message into a computer system, said computer system including a database holding a plurality of fraud decision nodes defining criteria against which said attempted call may be tested and wherein, based on satisfaction of said criteria, said fraud decision nodes cooperatively defining fraud screening trees each having a starting node, a first subset of said fraud decision nodes cooperatively defining a first fraud screening tree, each of the plurality of said fraud decision nodes comprising a database table, wherein a row in each fraud decision node defines a next fraud decision node based on specified criteria;

selecting, based on said customer billing number, the starting node of said first fraud screening tree;

starting with the starting node, applying the plurality of fraud decision nodes defining the first fraud screening tree, said first fraud screening tree producing a determination of whether or not to block said attempted call due to a likelihood that the attempted call is fraudulent; and before said attempted call is connected to said dialed number, returning to said querying system a response data message indicative of said determination, whereby, if said determination is to block said attempted call, said attempted call is not connected to said dialed number.

71. A method as claimed in claim 70, wherein said billing number is associated with a service code designation defining a predetermined level of fraud screening for said billing number, and wherein selecting the starting node of said first fraud screening tree comprises referring to a tree mapping table keyed to said service code designation.

72. A method as claimed in claim 71, wherein said service code designation further defines a predetermined market class of said billing number.

73. A method as claimed in claim 70, wherein each of a plurality of said fraud decision nodes comprises a database table, and wherein a row in each fraud decision node defines a next fraud decision node based on specified criteria.

74. A method as claimed in claim 70, wherein said billing number is associated with a market class, and said method further comprises selecting the starting node of said first fraud screening tree based on said market class.

75. A method as claimed in claim 70, wherein said fraud decision nodes are selected from the group consisting of a date/time node, a call origination node, an information digits node, an originating point code node, and a dialed number node.

76. A method as claimed in claim 70, wherein said step of verifying said billing number is preformed by a reference to a validation database.

77. A method as claimed in claim 70, wherein said computer system comprises an SCP.

78. A method as claimed in claim 70, wherein said querying system comprises a telecommunications switch.

79. A method as claimed in claim 70, wherein said querying, system comprises an operator center.

80. A method as claimed in claim 70, wherein said data message comprises a transaction capabilities application part (TCAP) message.

81. A method as claimed in claim 80, wherein said data message further comprises a signaling connection control part (SCCP).

* * * * *